United States Patent

[11] 3,584,505

| [72] | Inventor | Heinrich Seligmann<br>Erlangen, Germany |
|---|---|---|
| [21] | Appl. No. | 824,833 |
| [22] | Filed | May 15, 1969 |
| [45] | Patented | June 15, 1971 |
| [73] | Assignee | Siemens Aktiengesellschaft<br>Berlin and Munich, Germany |
| [32] | Priority | May 1, 1968 |
| [33] | | Germany |
| [31] | | P 17 73 550.1 |

[54] MEASURING DEVICE FOR MONITORING STRESSES OF A TOOL
6 Claims, 4 Drawing Figs.

[52] U.S. Cl. .................................................. 73/133,
    73/136, 73/88.5
[51] Int. Cl. .................................................. G01l 5/16
[50] Field of Search ......................................... 73/88.5,
    133, 136

[56] References Cited
UNITED STATES PATENTS

| 2,359,125 | 9/1944 | Langer et al. .................... | 73/136 |
| 2,548,397 | 4/1951 | Schaevitz ........................ | 73/136 |

FOREIGN PATENTS

| 453,819 | 1/1949 | Canada ........................ | 73/136 |
| 741,259 | 11/1943 | Germany ........................ | 73/140 |
| 784,733 | 10/1957 | Great Britain .................. | 73/136 |
| 862,462 | 3/1961 | Great Britain .................. | 73/136 |
| 152,580 | 1/1963 | U.S.S.R. ........................ | 73/133 |
| 157,540 | 3/1964 | U.S.S.R. ........................ | 73/133 |
| 1,122,742 | 1/1962 | Germany ........................ | 73/136 |

Primary Examiner—Charles A. Ruehl
Attorneys—F. H. Henson, C. F. Renz and A. S. Oddi ABSTRACT: A device for measuring stresses, including torque and bending moment of a tool, is disclosed wherein a rotor member operatively associated with the tool has strain gauges disposed thereon substantially parallel to the longitudinal axis to sense the bending moment at a tool and strain gauges disposed at an angle to the longitudinal angle to sense torque at the tool. Slots are provided in the rotor member to make it spring in the axial direction. The outputs of the strain gauges are sensed to provide an indication of the torque and bending moment operative on the tool.

MEASURING DEVICE FOR MONITORING STRESSES OF A TOOL

BACKGROUND OF THE INVENTION

1. Field of the Invention

The present invention relates to measuring devices and, more particularly, to measuring devices adapted for use with tools for measuring the bending moments and torques on the tool.

2. Discussion of the Prior Art

In many machine tool applications, it is highly desirable to monitor the working tool being utilized for drilling, milling, boring or other machine tool operations. Monitoring the torques and bending moments is particularly important in automatic machine tools such as numerically controlled machine tools which are programmed to perform automatically certain machining functions. In such automatic machine tool applications, it is important to measure and maintain the torque and bending moments under continuous control otherwise these stresses may deleteriously influence the dimensional accuracy of the machine operation, the machining speed of the workpiece and the stability of the operation. Additionally, in adaptive machine tool operation, it is desirable to control the speed of the tool in accordance with the media (metal or air, for example) in which the tool is operating.

The ideal point for measuring the torque and bending moment of the tool is on the tool itself or on adjacent securing structures, such as the spindle housing or collet of a machine tool, with the measuring device rotating with the tool. This permits the adequate measurement of the torque and bending moment, but gives rise to the problem of extracting the measured information and providing an indication thereof for use in the control of the machine tool. One technique of extracting torque and bending moment information from the strain gauges would be through the use of a slip ring-contact arrangement. This arrangement however has serious drawbacks which leads to errors in measurement due to rough operation because of contact resistance between the slip ring and the brushes. Moreover, due to the necessity of the mechanical connection between the slip ring and brushes, wear will result which will eventually require maintenance.

It would therefore be highly desirable if a measuring device could be provided which gives an accurate measurement of the torque and bending moment existing at a work tool and which permits the ready extraction of this information without the necessity of mechanical connection to the measuring device itself.

SUMMARY OF THE INVENTION

Broadly, the present invention provides a measuring device for measuring the stresses of a tool wherein the device is operating associated with the tool and includes strain sensing means thereon for giving indications of the stresses at the tool.

DESCRIPTION OF THE PREFERRED EMBODIMENTS

Figure 1:
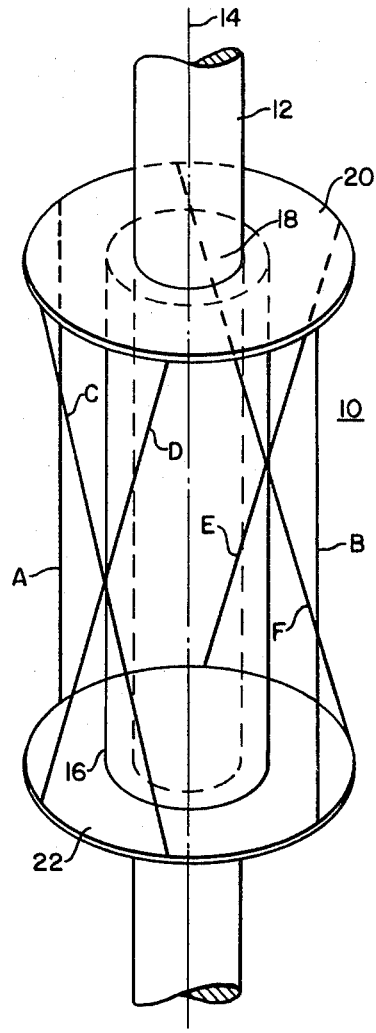
FIG. 1 is a pictorial drawing of one embodiment of the measuring device of the present invention.

Referring to FIG. 1, a measuring or rotor device 10 is shown secured to a shaft 12 which may comprise the shaft of a work tool, such as a drilling, milling or other commonly used tool in a machine tool. The shaft 12 has a longitudinal axis 14, the top end of the shaft 12 going to a spindle housing to be secured within the collet, not shown, of the machine tool. The bottom end of the shaft 12 comprises the working end of the tool.

The device 10 includes a cylindrical body portion 16 which has a hollow central portion 18 through which the shaft 12 is disposed. A top flange portion 20 is integrally secured to the top end of the cylindrical body portion 16 and a bottom flange member 22 is secured to the bottom portion of the cylindrical portions 16. The body portion 16 and the flange portions 20 and 22 may be formed from one piece of suitable metal or secured together by suitable means. The flange portions 20 and 22 are shown to be disc-shaped and have holes in the center thereof to permit the passage of the shaft 12 therethrough along the longitudinal axis 14. The device 10 may be secured to the shaft 12 by any suitable means such as set screws so as to rotate therewith.

In all the embodiments shown herein the device 10 is shown secured to the shaft 10 of the tool. However, it should be understood that the measuring device 10 could, if desired, form an integral part of the tool or alternately the measuring device 10 could be secured to the spindle housing or collet in such a position as to sense the torque and bending moment of the tool.

Secured between the top flange 20 and the bottom flange 22 are a plurality of strain gauges designated A, B, C, D, and F. The strain gauges are held under a slight tension between the flanges 20 and 22. The strain gauges A and B are disposed between the flanges 20 and 22 parallel to the longitudinal axis 14, while the strain gauges C, D, E and F are disposed at an angle with respect to the longitudinal axis 14. The strain gauges A and B parallel to the longitudinal axis 14 are utilized for measuring the bending stresses appearing at the tool. The strain gauges C, D, E and F disposed at an angle to the longitudinal axis 14 are utilized for measuring the torsional stresses on the tool. The manner in which the strain gauges A-B and C-F are utilized will be explained in further detail below with respect to the embodiment of FIGS. 3—4.

Thus, as the shaft 12 of the tool deflects on an axis perpendicular to the longitudinal axis 14, a bending moment is applied to the measuring device 10 and the strain gauges A and B. In response to the bending stress the strain gauges A and B have a characteristic thereof changed, for example their resistance, in proportion to the magnitude of the bending moment. The strain gauges C-F are responsive to torsional stresses applied to the device 10 and have a characteristic thereof changed in response to the torsional stress. If resistance type strain gauges are utilized, whose resistance change as a function of the stress, they may be conveniently connected in a Wheatstone bridge array. Thus, strain gauges A and B may be connected as two legs of a Wheatstone bridge and the strain gauges C, D, E and F may be connected as the four legs of a separate Wheatstone bridge. The particular bridge connections will be discussed below with respect to FIG. 4.

Figure 2:
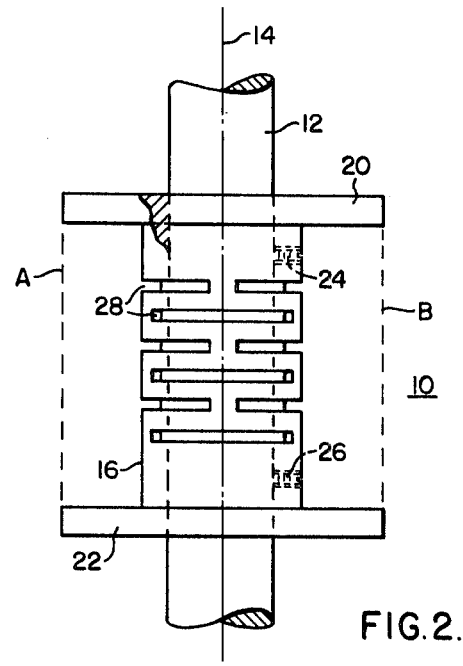
FIG. 2 is a side view of the measuring device of the present invention.

FIG. 2 shows a side view of the rotor device 10 wherein set screws 24 and 26 are provided to secure the device 10 through the body portion 16 to the shaft 12. Additionally shown in FIG. 2 are a plurality of slots 28 which extend into the outer portion of the body portion 16 circumferentially therearound for a substantial portion of the circumference but not the total circumference. These slots are perpendicular to the longitudinal axis 14 and do not extend completely through the thickness of the cylindrical body portion 16. The function of the slots 28 is to cause the member 10 to be springy in the axial direction and thereby be more responsive to bending moments and torques applied thereto from the tool and thereby provide a greater output indication from the strain gauges A through F.

The measuring or rotor device 10 so far described in FIGS. 1 and 2 thus is responsive to deflections of the tool in response to bending moments and torques applied thereto. The strain gauges A and B are responsive to deflections of the tool from the longitudinal axis 14 due to bending moments and provide an indication of the quantity and direction of bending moment applied to the tool. The strain gauges C-F are responsive to angular deflections of the tool caused by the torque applied to the tool and provide an output indication thereof.

Figure 3:
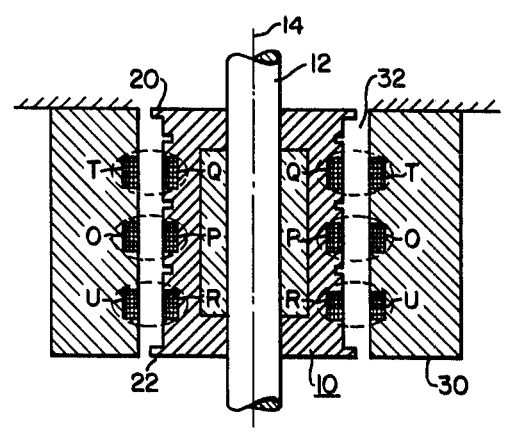
FIG. 3 is a side-sectional view of another embodiment of the present invention.
Figure 4:
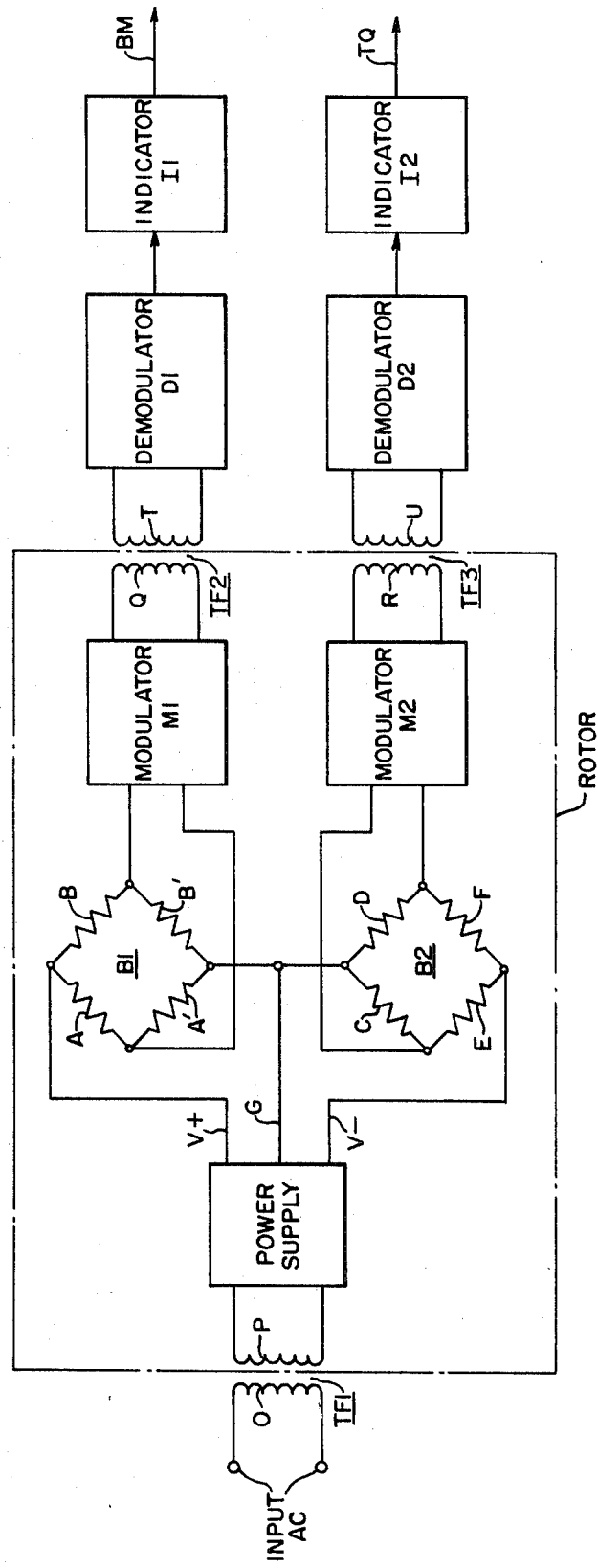
FIG. 4 is a schematic-lock diagram of the circuitry as utilized in the embodiment of FIG. 3.

FIGS. 3 and 4 show an embodiment wherein the output indications provided by the strain gauges may be outputted from the rotor member 10 without the necessity of mechanical connections thereto such as through the means of a slip ring-brush arrangement. As shown in FIG. 3, a stator member 30 is disposed around the rotor member 10 and is rigidly fixed against rotation. An air gap 32 thus exists between the rotor 10 and the stator 30 so that the rotor 10 may freely rotate with respect to the stator member 30. A plurality of windings O, P, Q, R, T and U are provided, with the windings P, Q and R, in the form of coils, being disposed on the rotor 10, the winding P being centrally disposed and the windings Q and R disposed on the respective sides thereof. Disposed in the stator 30 are the windings O, T and U, in the form of coils, with the winding 0 being centrally disposed. The winding 0 of the rotor device 10 is inductively coupled to the winding P of the stator 30. The windings Q and R of the rotor device 10 are, respectively, inductively coupled to windings T and U of the stator 10. The respective winding pairs O-P, T-Q and R-U are so designed as to minimize inductive coupling between the other windings except the designated pairs.

Referring to FIG. 4, which is a schematic-block diagram of the electrical interconnections for the embodiment of FIG. 3, input AC is applied to the stator winding 0 with the winding 0 forming the primary of a transformer TF1. The input AC may conveniently comprise 120 volt, 60 Hz. supply, for example. The secondary of the transformer TF1 comprises the rotor winding P which is coupled to a power supply PS which may comprise any well known type of power supply for converting the alternating current input from the secondary winding P to a direct current output. The power supply PS has a positive voltage (B+) output, a negative voltage (B—) output and a ground terminal G. The power supply PS is physically disposed within the rotor member 10 and is carried thereby. Conveniently, the power supply PS is fabricated from miniaturized components or in integrated circuit form.

Connected across the B+ and G outputs of the power supply PS IS A Wheatstone bridge B1. The bridge B1 includes strain gauges A and B as two arms thereof and fixed resistors A' and B' which form the other two legs of the bridge B1. The output of the bridge B1 is taken from the junction between the strain gauge A and the fixed resistor A' and the junction between strain gauge B and the fixed resistor B'. This output is applied as the input to a modulator M1, and is indicative of the bending moment at the tool.

When no bending moments are applied to the tool the bending moment bridge B1 is in a balanced state so that no output is supplied to the modulator M1. The fixed resistors A' and B' are accordingly selected to provide this balanced state at the no bending moment condition. When however bending moments are applied to the tool, the resistance values of the strain gauges A and B will change accordingly causing an unbalanced condition to be created across the output of the bridge B1 which will cause a voltage proportional to the bending moment applied to the tool to appear at the output of the bridge B1 which is applied to the modulator M1.

A Wheatstone bridge B2 is also carried by the rotor member 10. The four arms of the bridge B2 comprise the strain gauges C, D, E and F which are carried by the rotor member 10 as previously described. The bridge B2 is connected between the B+ and G outputs of the power supply PS with the output thereof being taken from the junction of the strain gauges C and E and the strain gauges D and F, respectively. The output of the bridge B2 is applied to a modulator M2.

When no torque is applied to the rotor member 10, the bridge B2 is so designed to be in its balanced state with the strain gauges C, D, E and F being so selected to provide the necessary resistance values. However, when torque is applied to the tool, the resistance values of the various strain gauges C, D, E and F will be changed in response thereto so that the bridge B2 will be unbalanced and will provide an output which is proportional to the magnitude of the torque applied to the tool.

The modulators M1 and M2 are both disposed to be carried by the rotor member 10 and are so designed to be modulated according to the input supplied thereto from their respective bridge circuits B1 and B2. The modulators M1 and M2 may, for example, comprise amplitude modulators wherein the carrier frequency thereof, which may be set at a convenient value, is modulated in amplitude according to the amplitude of the input voltage supplied thereto from the respective bridges B1 and B2. Alternatively, the modulators M1 and M2 may comprise frequency modulators wherein the rest frequency, that is, the frequency of the modulator when the respective bridges B1 and B2 are balanced, is modulated in accordance with the magnitude of the output voltage supplied by the bridges B1 and B2, respectively. The modulators M1 and M2 are designed from miniaturized components or, more conveniently, may be fabricated of integrated circuits so as to be conveniently disposed within the rotor member 10.

The modulated output of the modulator M1, which is indicative of the bending moment applied to the tool, is applied to the rotor winding Q. The rotor winding Q acts as the primary winding of a transformer TF2 and is inductively coupled to the stator winding T acting as the secondary winding so that the modulated signals from the modulator M1 and winding Q are induced in the winding T. The induced modulated signals of the winding T are coupled to a demodulator D1 which is operative to demodulate the original information indicative of the bending moment which was utilized to modulate the modulator M1. The demodulated signals from the demodulator D1 indicative of the bending moment of the tool are applied to an indicator I1 to indicate the magnitude of the bending moment and provide an output DM which may be utilized as a control signal to cause the proper control function to take place in the machine tool in accordance with the bending moment sensed.

The modulated output of the modulator M2, indicative of the torque at the tool, is applied to the rotor winding R, operative as the primary winding of a transformer TF3, with a corresponding signal being induced in the stator winding U which is inductively connected to the winding R as the secondary winding of the transformer TF3. The induced modulated signals from the winding U are applied to a demodulator D2 for demodulation therein to provide demodulated output signals which are indicative of the information originally supplied to the modulator M2 corresponding to magnitude of the torque applied to the tool. The demodulated signal from the demodulator are applied to an indicator I2 which supplies an indication of the torque sensed as an output TQ. The torque output TQ may then be utilized for the control of the machine in accordance with the sensed torque.

The demodulators D1 and D2 would be of the type capable of demodulating the information which is originally modulated by the modulators M1 and M2, respectively. If amplitude modulation were used the demodulators D1 and D2 would comprise modulators capable of demodulating amplitude modulation signals, and, correspondingly, if frequency modulation M1 and M2 were utilized, the demodulators D1 and D2, respectively, would comprise demodulators capable of demodulating frequency modulation signals.

It can thus be seen in the system as shown in FIG. 4 that through the use of the inductive couplings between the winding pairs O-P, Q-T and R-U mechanical interconnections between the rotor and stator members have been eliminated. Thus the attendant problems associated with such mechanical interconnections have been eliminated. Moreover, the use of modulation-demodulation techniques permits operation at frequencies which may readily be sensed for providing accurate and rapidly responsive output signals for use in the control of the machine tool in accordance to the bending moments and torque operative on the measuring device as taught herein.

Bending moments causing the tool to be deflected from its normal line of operation will be sensed by the measuring device to provide the output signals BN indicative thereof which may be utilized to correct any errors due to the deflection of the tool itself from the longitudinal axis 14 which would otherwise cause erroneous machining operations to take place. Correspondingly, the provision of the torque output signals TQ may be utilized for control purpose to eliminate errors due to the angular displacement of the tool about the longitudinal axis 14.

Moreover, supplying bending moment and torque outputs provides a convenient indication of whether the tool is actually engaging the workpiece or is merely rotating in air. An indication of the media in which the tool is operating is highly important since this permits adaptive operation of the tool so that its speed may be controlled in accordance with the media. For example, the tool may be operated at high speeds when operating in air and at such lower speeds as desired when engaging the work piece, with the speed being controlled in response to the bending moment signals BM and the torque output signals TQ.

Although the present invention has been described with a certain degree of particularity, it should be understood that this disclosure has been made only by way of example and that numerous changes in details of construction and the combination and arrangement of parts, elements and components can be resorted to without departing from the spirit and scope of the present invention.

I claim:

1. A device for measuring stresses on a tool comprising:
   a rotor member adapted to be operative with said tool;
   a first bridge array carried by said rotor member and including first strain gauges mounted on the rotor member substantially parallel to the longitudinal axis of the rotor member for providing a first output indicative of the bending moment at said tool;
   a second bridge array carried by said rotor member and including second strain gauges mounted on the rotor member at an angle to said longitudinal axis for providing a second output indicative of the torque at said tool;
   first and second modulation means carried by said rotor member for, respectively, receiving said first and second outputs and providing first and second modulated signals in response thereto;
   first and second output means carried by said rotor member for receiving said first and second modulated signals respectively;
   a stator member fixed with respect to said rotor member and including (a) stator power means for providing operating voltage signals, and (b) first and second sensing means inductively coupled to said first and second output means respectively for sensing said first and second modulated signals respectively;
   rotor power means carried by said rotor member and inductively coupled to said stator power means and being responsive to said operating voltage signals to provide operating power to said bridge arrays and said first and second modulation means; and
   first and second demodulating means connected to said first and second sensing means, respectively, for demodulating said first and second modulated signals, respectively, and providing first demodulated signals indicative of said bending moment and second demodulated signals indicative of said torque, respectively.

2. Apparatus for measuring strains of a rotatable tool having a shaft comprising:
   a rotor member having a hollow body portion with a central bore therethrough through which the tool shaft extends, said body portion having opposite ends corresponding to the opposite ends of said bore, said body portion having on its peripheral surface a plurality of axially spaced peripheral slots which are substantially perpendicular to the longitudinal axis of said bore, said body portion having means at opposite ends thereof for securing it to said shaft, said rotor member having radial flanges at opposite ends of and attached to said body portion, a plurality of strain gauges carried by said rotor member, each secured at opposite ends thereof from flange to flange at peripheral points on said flanges, one part of said plurality of strain gauges being disposed parallel to said axis for measuring the deformation of the tool due to bending movement applied to the tool, and another part of said plurality of strain gauges being disposed at an angle to said axis for measuring deformation of the tool due to torque applied to the tool.

3. The combination as in claim 2 which includes:
   sensing means including first means responsive to said parallel disposed strain gauges and second means responsive to said angularly disposed strain gauges, said first and second means providing indications, respectively, of said deformation due to the bending moment and said deformation due to the torque.

4. The combination as in claim 2 wherein:
   said parallel disposed strain gauges are operatively connected in a first bridge array for measuring said deformation due to the bending moment;
   said angularly disposed strain gauges are operatively connected in a second bridge array for measuring said deformation due to the torque.

5. The combination as in claim 2 wherein said central bore has an intermediate portion of greater diameter than the end portions of the bore whereby the wall of said intermediate portion of the bore is free of the tool shaft surface portion coextensive with said intermediate portion of the bore.

6. The combination as in claim 2 wherein said slots extend less than completely through said body portion.